Figure 3:
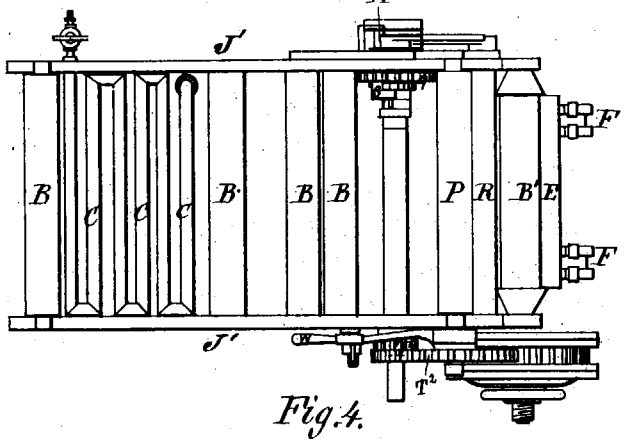

W. LANCASTER & J. BULLOUGH.

Machine for Drying and Beaming Yarn.

No. 8,474. Reissued Oct. 29, 1878.

Witnesses.
Wm. Tinell Andrews Jr.
Louis A. Curtis

Inventors.
W. Lancaster & J. Bullough.
F. Curtis. Atty.

N. PETERS, PHOTO-LITHOGRAPHER, WASHINGTON, D. C.

W. LANCASTER & J. BULLOUGH.

Machine for Drying and Beaming Yarn.

No. 8,474. Reissued Oct. 29, 1878.

*Witnesses.*
Wm. Tinell Andrews Jr
Louis A Curtis

*Inventors.*
W. Lancaster & J. Bullough.
F. Curtis, Atty.

N. PETERS, PHOTO-LITHOGRAPHER, WASHINGTON, D. C.

UNITED STATES PATENT OFFICE.

WILLIAM LANCASTER, OF CONSTADT, GERMANY, AND JOHN BULLOUGH, OF ACCRINGTON, ENGLAND.

IMPROVEMENT IN MACHINES FOR DRYING AND BEAMING YARN.

Specification forming part of Letters Patent No. 150,058, dated April 21, 1874; Reissue No. 8,474, dated October 29, 1878; application filed June 19, 1878.

*To all whom it may concern:*

Be it known that we, WILLIAM LANCASTER, of Constadt, in the Kingdom of Würtemberg, Empire of Germany, at present residing in Accrington, in the county of Lancaster, England, and JOHN BULLOUGH, of Accrington aforesaid, have invented certain Improvements in Machinery for Sizing and Drying Yarns, of which the following is a specification:

In the machine in which our invention is comprised we conduct the yarn, by means of guide-rollers, in such direction and divert its course so as to form several layers or sheets extending from the size-box to the weaver's beam. Between these layers of yarn we place a series of pipes heated with steam, and we employ one or more fans to agitate and circulate the air thus heated against, along, and through the various layers of yarn. The fan or fans are most efficient when placed in the body of the machine and encircled almost completely by the layers of yarn. In this position the air agitated by the fan or fans and the heat arising from the pipes act on several layers or sheets of yarn, instead of only on one single sheet, and so its effect in drying the yarn is very great, being in proportion to the number of layers, which may be more or less, as determined by the number of guide-rollers employed.

Our improvements relate to means for exerting pressure upon and leveling or hardening the yarn wound upon the weaver's beam; and to effect this result we employ a roller, which is to be applied in such manner as to be readily removed and replaced without disturbance to the other parts of the machine, and which is of a length to properly adapt it to the length of the beam, said roller being supported and revolving upon anti-friction bowls carried by short arms attached to a cross-shaft situated below and parallel to the beam, and to one end of which is connected a lever provided with a sliding weight. The roller rests upon the periphery of the body of yarn upon the beam, while the arms permit the roller to adapt itself to the varying diameter of the beam as the yarn is wound upon it, while by the use of the sliding weight we are enabled to readily graduate and govern the degree of pressure which the roller exerts upon the beam. With the parts specified we combine a ratchet and detent and a pressure-screw, as hereinafter described.

Our improvements relate, also, to means whereby we are enabled to "doff" or remove the weaver's beam without stopping the machine or suspending any of its motions. For this purpose it is necessary, while the change of beam is being effected, that the yarn should be delivered at a point near to but entirely independent of any aid or pull from the weaver's beam, because such aid or pull does not exist in the interval between the severing or cutting the yarn of the full beam from the yarn in the machine, and while attaching the severed threads to the replaced or empty beam. If, therefore, the delivery of yarn to the front depended on the pull from the weaver's beam, it is evident that pull would be wanting during the operation of doffing, and so the yarn would remain stationary in the machine, and the obvious advantages of keeping the machine in motion would be lost. Instead, then, of merely passing the yarn over the surface of a roller after it leaves the opening-rods, and thence to the weaver's beam, we arrange three rollers for it to pass over and under. One of these rollers is driven, directly or indirectly, from the first-motion shaft; and of the other two rollers, one rest on the top and the other against the side of the driven roller. The yarn is passed over the top roller, then under the second roller, and thence over the third roller, and finally to the weaver's beam. The hold or tensional gripe which these rollers have on the yarn when so passed about them is quite sufficient to enable them, when put in motion, to pull the yarn given out by the ordinary copper roller through the machine, and to deliver it to the front independently of any aid or pull from the weaver's beam, and thus the yarn of a beam, when full, may be cut or severed from the yarn in the machine, the full beam being removed and an empty beam put in its place without the motions of the yarn or machine being arrested, it only being necessary before the doffing process begins that the machine be put on the slow speed, which is effected by means of the gearing shown in the drawings, and hereinafter described.

We also employ, in connection with the group of tension-gripe rollers, a gang or train of interchangeable gears arranged upon a horizontal shaft, and we combine with such train of gears an intermediate gear pivoted to one extremity of a bell-crank lever, which is, in turn, pivoted to the end frame of the machine, the opposite end of the said bell-crank lever being provided with a clamp-nut to confine it to the said end frame in such position as may be necessary to maintain the intermediate gear in engagement with one of the interchangeable gears, according to the speed at which the machine is to be driven.

The following is a full and complete specification of this invention, reference being had to the drawings.

Figure 4:
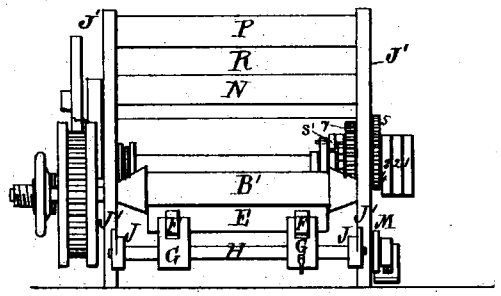
Figure 1:
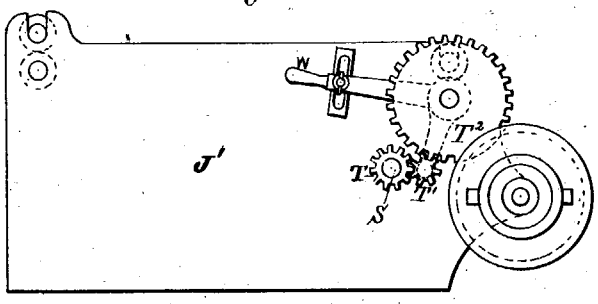
Figure 6:
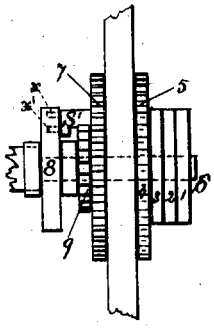
Figure 7:
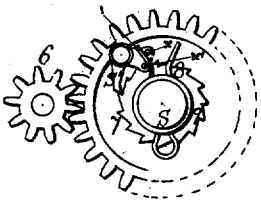
Figure 5:
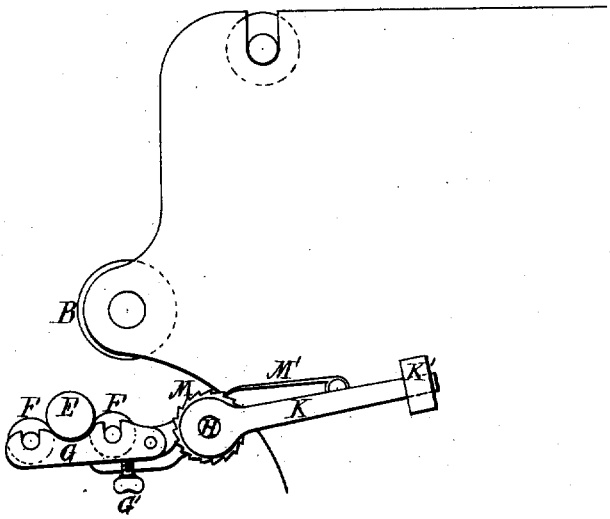

The drawings accompanying and making part of this specification represent, in Figure 1, a side elevation, in Fig. 2 a vertical section, in Fig. 3 a plan, and in Fig. 4 an end elevation, of a machine embodying our improvements, while Figs. 5, 6, and 7 represent details of such machine, to be hereinafter described.

Figure 2:
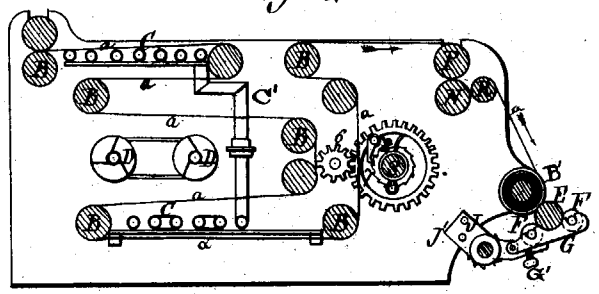

The yarn is shown in Fig. 2 of the drawings by lines *a a*. The end housings or supports of the machine are shown at J′ J′, the weaver's beam at B′, and the first-motion or driving shaft at S.

We dispose between the housings J′ J′, and generally throughout the rear part of the area inclosed by the same, a series of horizontal transverse parallel idle-rollers, B B B, and we pass the yarn to and about the rollers B, substantially as shown in Fig. 2 of the drawings, by this means diverting it in its passage from the size-box to the beam from a direct course, and, by leading it through a circuitous path and in several horizontal sheets or portions, expose it for a much greater period of time than heretofore to the action of a warm atmosphere without materially increasing the size of the machine.

At suitable points between or among the rollers B we intersperse a series of horizontal parallel or coiled pipes or boxes, C C, which are supplied with steam by upright feed-pipes C′.

In addition to the heating-pipes C, we employ fans, (shown at D D,) which are disposed about centrally of the rear portion of the machine, and which, when put in rotation, agitate and disturb the air, and thus increase its circulation about and through the yarn, and very greatly expedite the evaporating of the moisture in the latter.

As the heating-pipes C are arranged between the various sheets or layers of yarn, as stated, they operate to the greatest advantage, for the reason that they act upon a very large surface or number of surfaces or sheets of yarn at one and the same time, while, in addition to their drying qualities, they serve to support the yarn and prevent its being disturbed and disarranged by the action of the fans.

It may be well to place other or auxiliary heating-pipes between the fans D D, to add to the drying capacity of the machine when using "strong sorts," or to reduce such heating capacity and economize steam when using "light sorts."

Figs. 2, 3, 4, and 5 show the presser-roller and the mechanism for operating the same so as to harden and level the yarn on the weaver's beam.

In carrying out this portion of our improvements, E is the presser-roller applied to the yarn on the weaver's beam between its flanges, and the said roller is free to revolve on the anti-friction bowls F F, carried by the arms G G, attached to the cross-shaft H, the latter being supported by the boxes or bearings J J, bolted to the end frames J′. To one end of this shaft is attached the lever K, having an adjustable weight, K′, so that the pressure of the presser-roller E on the beamed yarn can be regulated as desired. The ratchet-wheel M and catch M′ are employed to retain the presser-roller away from the beam when doffing or removing the same. (See Fig. 5.)

Underneath one of the arms G, carrying the anti-friction bowls, is a screw, G′, by means of which the pressure of the friction-bowls F is increased or diminished on the roller E and the beam, and in this way the pressure is regulated and made equal along the surface of the beam.

In carrying out the portion of our improvement which aims to doff or remove the weaver's beam without stopping the machine, and so prevent the damage or injury to a portion of the yarn through overheating, more particularly that portion which is on the surface of the hot rollers in the size-box, it is necessary, while the change of beam is being made, that the yarn should continue to be delivered, but at a much reduced speed, and at a point near to the beam, but entirely independent of any aid or pull therefrom, because such aid or pull does not exist in the interval between the severing or cutting the yarn of the full beam from the yarn in the machine, and while attaching the severed threads to the replaced or empty beam.

To effect this necessary continuous slow draw or progress of the yarn through the machine, and thus carry out this portion of our improvements, we employ a trio of horizontal parallel rollers, (shown at N P R in the drawings, more particularly in Fig. 2,) such rollers being disposed at the upper front corner of the machine, and revolving in bearings in the housings J′ J′. The roller N is power-driven, (while the rollers P and R are driven by friction,) and derives its motion from the driving or first-motion shaft S by means of the gears T $T^1$ $T^2$, the geer T being affixed to the journal of the said shaft S, the gear $T^2$ to the journal of the roller N, and the gear $T^1$ being an intermediate, and mounted on a stud affixed to the lower end of a bell-crank lever, W, said lever being pivoted to the journal of the roller N.

The yarn in its passage from the size-box, and after leaving the guide-rollers B, passes first over the upper roller, P, thence between such roller P and the roller N, which is situated immediately below the first; thence under and partially about the roller N, and between the latter and the roller R, which is situated to one side of said roller N; thence over the roller R, and so on down to the weaver's beam below.

The hold or tensional gripe which these rollers exert upon the yarn, when so passed about them, is effective to continue the necessary and required delivery of yarn to the empty or replaced beam, it only being necessary to put the machine on the slow speed, which is effected by means of the following devices: On the first-motion or driving shaft S are three pulleys, 1 2 3. Pulley 1 is the ordinary fast or driving pulley. Pulley 2 works loose on the shaft, as does also pulley 3, on the boss of which last pulley is a pinion-wheel, 4, gearing with the plate-wheel 5. On the other end of the stud of this plate-wheel is another pinion, 6, gearing with a second plate-wheel, 7, working loose on the shaft S. The spring-catch S′, attached to the plate-wheel 7, is, by the revolution thereof, and by the ear 1 of the spring 8, (see Fig. 7 of the drawings,) acting on the pin *x* on the catch, put in gear with the catch-wheel 9, which thus becomes the driver, and so the speed of the driving-shaft S is reduced, there being a consequent and like reduced speed of the draw-rollers N P R. On the driving-strap being moved to the pulley 1 the pin *x* will be acted on by the ear of the spring, and the catch will be raised thereby out of gear with the catch-wheel, and the higher or working speed of the machine will be resumed. The rollers N P R fulfill another object—namely, they equalize the tension on the threads coming through the opening-rods. Were it not for these rollers the tension of the yarn from the surface of the weaver's beam to the opening-rods would vary in accordance with the irregularity of that surface, those threads forming the ridges of the beam being the tightest and those forming the hollows being the slackest. By the interposition of these rollers, however, with their true surfaces, the state of the yarn from them to the opening-rods is independent of the surface of the weaver's beam, and so regularity of tension is obtained, "slack sides" are avoided, and the liability of breakage of yarn is much lessened.

The bottom or power-drawn roller N is driven at a positive uniform speed from the first driver, and as it drives the copper or delivery rollers by means of the side shaft, it follows that the speed of the said roller N determines the speed at which the yarn passes through the machine. This speed, once determined, remains unaltered till another speed is desired, which may be had in a few seconds by a change of gearing, thus increasing or diminishing the speed of the roller N. The slow motion is resorted to many times during the day for a variety of causes, and its usefulness soon makes a sizer look on it as indispensable.

To stop a machine is always objectionable. It stretches and strains the yarn in starting again, as the dead weight or inertia of the beams, rollers, and cylinders has suddenly to be overcome to get these parts in motion again. During the stoppage the squeezing-roller and the yarn are baking together, if the former is metal, and if (to avoid this baking) the roller is made of wood, it requires frequent repairs and renewals, and, as it cannot be depended on to remain true to any given diameter, it cannot be driven positively by the side shaft, because it will, owing to its ever-varying size and want of trueness, deliver more or less yarn than the copper roller in front of it requires; hence the great evil of the wood roller and the iron squeezer on the top of it, having to be pulled and turned by the yarn in its wet state. The slow motion renders it unnecessary to have this roller of wood. It can be metal, because, as the machine never stops for cutting lappers off, doffing, and all similar purposes, the roller continues in motion, and no baking takes place. Being made of metal, it can be slid to the exact diameter of the one in front of it, or (as is the usual practice) a trifle larger, and both these rollers are driven by the side shaft, thus relieving the yarn of the stress of pulling or turning the back pair of rollers. With the slow motion (both copper rollers being driven and the back one being carefully slid so as to be a trifle larger than the other) the yarn, so far from being stretched, is actually slack, and in a favorable state for absorbing size.

The slow motion and the trip-roller arrangement combined enables doffing to be performed without stopping. The yarn is wound about these rollers in such a way that they have great power in preventing it slipping under them. Even when the weaver's beam is cut adrift, the triple rollers will continue to deliver the yarn on the floor. The yarn is therefore given to the weaver's beam. The weaver's beam itself is driven at such a rate as is necessary to take up the yarn as fast as the rollers are delivering it. So little stress is put on the yarn that the beam would be very soft; but to get a hard beam without putting stress on the yarn, we apply the revolving presser before explained. It is quite out of the way of the sizer, and in action is very efficient.

In order to change or vary the working speed of the machine, we employ interchangeable gears T, mounted loosely upon the shaft S and compelled to rotate with such shaft, but permitted to slide upon it by an ordinary spline-and-groove connection, and, in connection with such gears and shaft, we employ the bell-crank lever W and its gear $T^1$, before explained.

To change the speed of the machine, the attendant loosens the nut which locks the handle of the lever to the machine-frame, and by lowering such handle removes the gear $T^1$ from engagement with the gear T. The attendant then slides upon the shaft S such one of the gears as he may need until it coincides with the gear $T^1$ when the lever W is restored to place and locked, and the selected gear engages the gear $T^1$, thus completing the change of speed.

Having thus described the nature, purposes, and advantages of our invention, we claim, and desire to secure by Letters Patent of the United States, the following, to wit:

1. The combination of the presser-roller, the cross-shaft, arms, and bowls supporting said roller, the lever K and its adjustable weight, the ratchet-wheel and detent, and the regulating-screw $G^2$, these parts being arranged for joint operation, substantially as set forth.

2. The combination, substantially as hereinbefore set forth, of a group of power-driven tensional-gripe rollers and mechanism whereby the speed or rate of movement of said rollers may be reduced to permit interchange of beams without stopping the machine.

3. In combination with the group of tensional-gripe power-driven rollers arranged for operation in connection with the weaver's beam, as explained, the interchangeable gears mounted on shaft S, and the bell-crank lever provided with a gear to put the said group of rollers in communication with the selected one of said interchangeable gears, as and for the purposes set forth.

WILLIAM LANCASTER.
JOHN BULLOUGH.

Witnesses:
W. H. WALKER,
THOS. PATERSON,
*Clerks.*